Nov. 28, 1950 W. A. BAILEY 2,532,139
PORTABLE HEATER AND COOKER
Filed Oct. 15, 1945 4 Sheets-Sheet 1

INVENTOR
WILLIAM A. BAILEY
BY
ATTORNEY

Nov. 28, 1950 W. A. BAILEY 2,532,139
PORTABLE HEATER AND COOKER
Filed Oct. 15, 1945 4 Sheets-Sheet 2
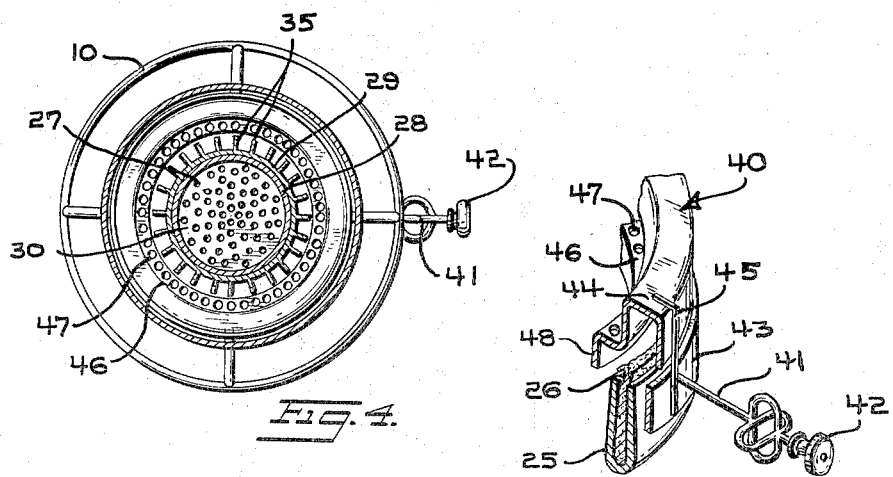
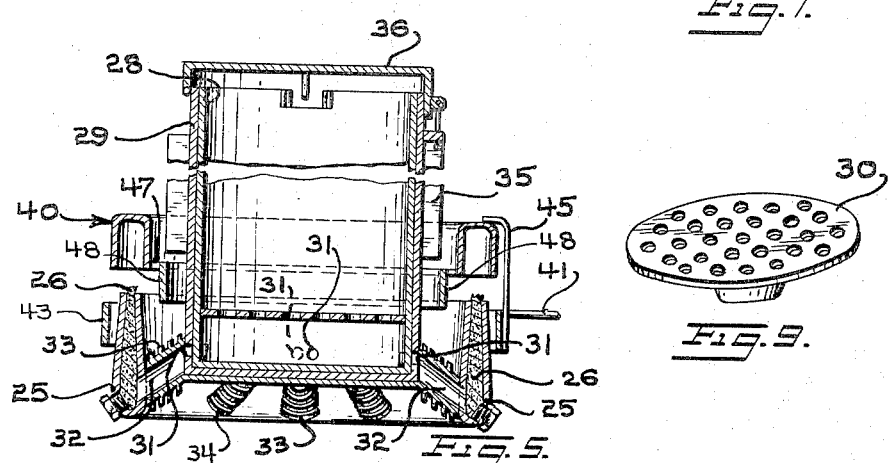
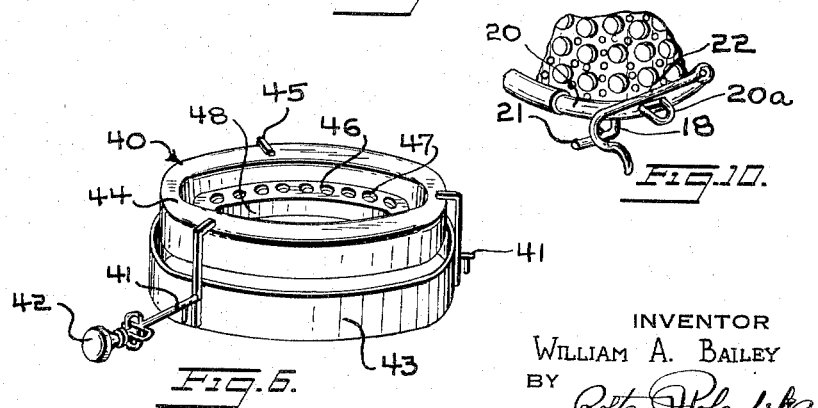
INVENTOR
WILLIAM A. BAILEY
BY
ATTORNEY

INVENTOR
WILLIAM A. BAILEY
BY
ATTORNEY

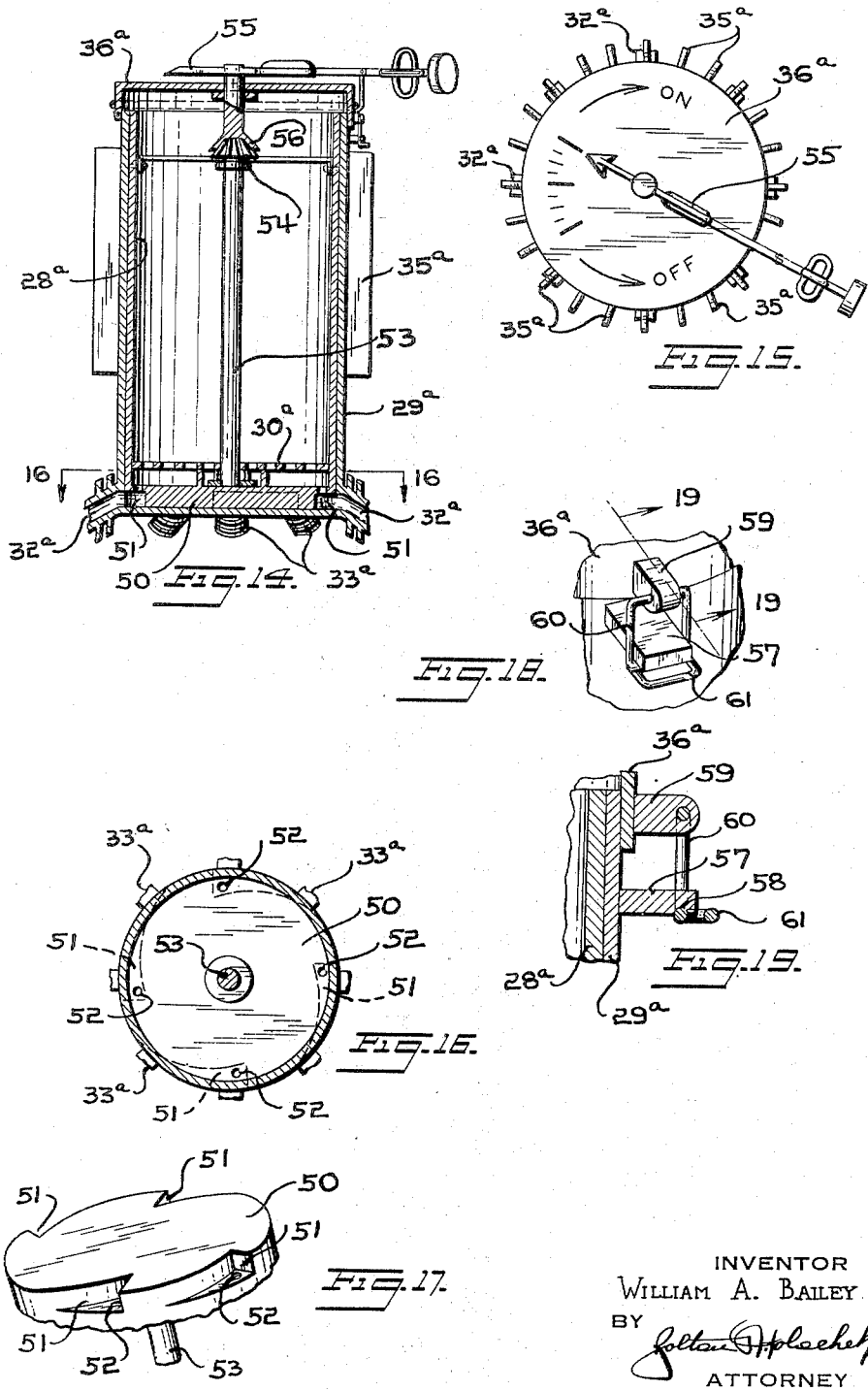

Patented Nov. 28, 1950

2,532,139

UNITED STATES PATENT OFFICE 2,532,139

PORTABLE HEATER AND COOKER

William A. Bailey, New York, N. Y.

Application October 15, 1945, Serial No. 622,244

4 Claims. (Cl. 158—72)

This invention relates to new and useful improvements in a portable heater and cooker.

More specifically, the present invention proposes the construction of a portable heater and cooker employing wax or wax compound as a fuel and characterized by having means for extinguishing the flame and preventing smoking after extinguishment of the flame.

Still further, it is proposed to provide a heater and cooker as aforesaid, having improved or suitable latch means for securing two of its casing sections together.

Another object is to provide a heater and cooker as aforesaid having means for holding the fuel burner horizontal during tilting of the casing and associated parts.

For further comprehension of the invention, and of the objects and advantages thereof, reference will be had to the following description and accompanying drawings, and to the appended claims in which the various novel features of the invention are more particularly set forth.

In the drawings:

Fig. 4 is a section on the line 4—4 of Fig. 2.

Fig. 5 is a fragmentary central sectional view of the wax container.

Fig. 6 is a perspective view of the ring assembly.

Fig. 7 is a fragmentary perspective view of a portion of the ring assembly, showing one part thereof in section.

Fig. 9 is a perspective view of the fuel-supporting platform.

Fig. 10 is a perspective view of three associated parts forming a latch.

Fig. 14 is a view of a wax container constructed in accordance with a modification of this invention.

Fig. 15 is a plan of Fig. 14.

Fig. 16 is a section on the line 16—16 of Fig. 14.

Fig. 17 is an inverted perspective view of the bottom of the innermost part of the container of Fig. 14.

Fig. 18 is a perspective view showing a latch constructed in accordance with a modification of this invention.

Fig. 19 is a section on the line 19—19 of Fig. 18.

Figures 3, 8:
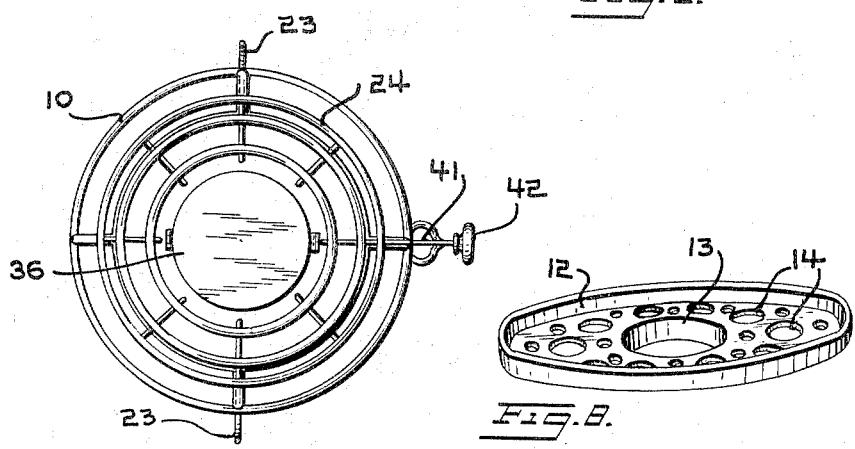
Fig. 3 is a plan view of the heater and cooker.
Fig. 8 is a perspective view of the reheating well.

The portable heater and cooker, according to this invention, comprises a base 10 made of wire stamping or casting, circular in cross section and bent and welded into an appropriate shape, the base standing on four legs 11. In the bottom portion of the base is secured a well 12 best shown in Fig. 8. The well 12 has a depressed central portion 13 serving as a reheating platform, designated 30 in Fig. 9, for the reception of alcohol or other suitable liquid fuel, which is ignited in the circumstance when the heater is first operated, and when the heater runs dry and a new wax refill is placed in the wax refill compartment of the heater, to re-start the heater in operation. The base of the well 12 is provided with orifices for the flow of air therethrough for supplying oxygen to the flame of the alcohol or other fuel. A casing lower section 15 is secured to the base, this section comprising a perforated sheet metal ring. The section 15 has three inclined slots 16 in the bottom edge of each of which are a series of recesses 17. Mutually spaced dowels 18 secured to the outer periphery adjacent the top margin of the outer periphery of the lower section 15 extend radially therefrom.

An upper casing section 19 is provided for positioning in vertical extension of the lower casing section 15 above the latter. The interior diameter of the upper section 19 is made substantially equal to the exterior diameter of the lower section 15, over which the former may slide. The lower part of the upper casing section is made of perforated sheet metal, whereas the upper part of the upper casing section is made of imperforate sheet metal. The two parts may be spot welded together with a lap joint (see Fig. 2) or they may be formed in one piece from a single sheet in obvious manner. The upper casing section 19 slides over the top of the lower section 15 and is supported on top of the dowels 18. Portions of the bottom edge of the upper section 19 are rolled loosely over a wire ring 20 which may slide circumferentially with respect to the upper section. Hooks 21 are welded or otherwise fixed to the ring 20 extending downwardly therefrom in position to engage the dowels 18 when the ring is turned circumferentially, for which purpose an outwardly extending loop 20a is fixed to the ring 20. Clearly, the ring 20 may be turned circumferentially to the left, as viewed in Figs. 1 and 10, to bring the hooks 21 fixed thereto beneath the dowels 18 which are fixed to and extend diametrically from the upper part of the lower casing section 15. To prevent the hooks 21 from becoming disengaged from the dowels 18, locking hooks 22 are pivoted to the bottom edge of the upper casing section 19 in position to swing downwardly and embrace the dowels on the sides opposite to those against which the hooks 21 bear. Thus, relative rotation of the upper and lower casing sections may be prevented, and when the upper casing section is lifted the lower casing section may be lifted with it.

A handle 23 is connected to the top portion of the upper section, this handle being adapted to swing downwardly out of the way. A grid 24 is hinged to the top edge of the upper section for supporting a tea kettle or other cooking utensil.

Inside the lower section of the casing, a fuel burner 25 is secured to the top edge of the base. This burner is here shown as an annular ring, U-shaped in cross section, and open at the top. It is filled with wick material 26. Concentric with the burner and inwardly thereof, with its bottom above the bottom of the burner, is a wax chamber 27. This chamber includes an inner cylinder 28 and an outer cylinder 29. The inner cylinder 28 and the outer cylinder 29 have closed bottoms and open tops.

A platform 30 is disposed in the inner cylinder for supporting the refills (not shown), the refills being the fuel supply. The platform is perforated and is supported or elevated above the bottom wall of the inner cylinder so that the wax, as it melts, can drip freely to the bottom of the inner cylinder. The wax melts largely from the bottom by heat conduction from the burner 25.

The two cylinders have holes 31 in their bottom portions of their vertical walls. These holes are adapted to be aligned for flow of wax therethrough. However, by rotating the inner cylinder relative to the outer cylinder, these holes can be moved out of alignment cutting off the fuel supply, that is, the flow of melted wax. Instead of covering the holes completely to cut off the flow of fuel supply, the flow can be regulated by partially covering the holes.

The bottom portion of the inner wall of the burner has orifices and these orifices are connected by pipes 32 with the holes 31 in the outer cylinder for conducting the melted wax from the inner cylinder to the bottom of the burner. The pipes are inclined and have external vertical cross fins 33. There are also dummy pipes 34 with external vertical cross fins, which also conduct heat to the cylinders for melting the wax. Wires may also be employed if desired for conducting heat to the cylinder. These wires may be fine and welded or cast, in one piece, to the outer cylinder and to the burner ring. The entire lower half of fuel chamber together with feed pipes, dummy pipes, vertical cross fins and burners, can be cast in one piece, the upper half and top separately cast and the two parts welded together, or brazed.

The outer cylinder has vertical fins 35. A hinged cover 36 closes the top of the outer cylinder. The cover 36 has a handle 37 which extends radially through its depending rim opposite to the position of its hinge, being movable axially in and out of the cover. The handle 37 projects inwardly of the two cylinders 28 and 29 above the upper rim of the inner cylinder 28, and its inner end is bent as at 38 to coact with a slot 39 formed in the upper rim of the inner cylinder 28. Thus the handle may be thrust inwardly or pulled outwardly to rotate the inner cylinder with respect to the outer cylinder. See Fig. 2.

Figures 1, 2:
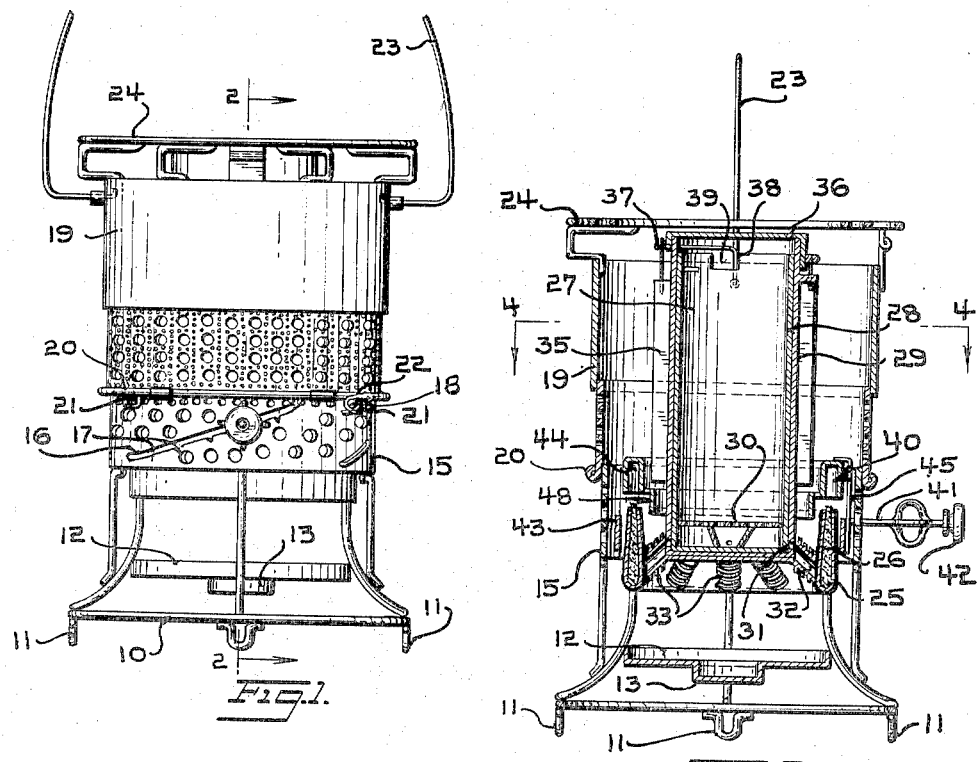
Fig. 1 is an elevational view of a portable heater and cooker constructed in accordance with this invention.
Fig. 2 is a section on the line 2—2 of Fig. 1, parts being shown in full.

The flame of the burning wax on the wick is quickly extinguished to prevent smoking by a ring, generally indicated 40, which is supported on pins 41 disposed in the inclined slots 16. One of these pins is long and terminates in a handle 42. By turning the handle around the lower section, the entire ring 40 may be rotated. Mutually spaced T-shaped pins 41, secured to and extending radially outwardly of the ring 40 project into the inclined slots 16, thus affording the raising or lowering of the ring and thereby raising or lowering the upper section 19 relative to the lower section 15. This ring is kept from slipping out of alignment with the burner by the T-shaped pins which slide inside of 15 (Fig. 2). The ring may be moved to various vertical positions, one position for each recess 17. The recesses 17 serve to hold the pins 41 in any desired adjusted position.

The ring 40 has an annular collar 43 surrounding the burner. It has a circular box-like channel 44 above the burner and connected to the collar 43 by legs 45. At the bottom of the channel 44 is an inwardly extending flange 46 having perforations 47 and descending from the inner edge of the flange 46 is a collar 48 depending interiorly of the burner. The channel is wide enough in cross section to enclose the burner with a close fit, extinguishing the flame of the wax quickly, preventing smoking. Accordingly, when the pins 41 are in the bottom of their respective associated inclined slots 16, the channel encloses the burner and thereby extinguishes the flame, namely by precluding access of oxygen to the flame; when the pins are at the top of their respective associated inclined slots 16, full access of air is afforded to the flame. The wick is maintained full of wax by wax seepage while the stove is cooling off after extinguishing the flame, which facilitates relighting of the wick when desired. The wick may be of any well known material, such as asbestos.

When the channel 44 is above the burner, that is, the T-shaped pins 41 are in the tops of the slots 16, the flame of the burner, which is lit by a match and which burns blue, passes upwardly outwardly of the channel and inwardly of the channel through the perforations 47. Thus the flame, or the heat of the flame, passes through the grid around the cover 36, the cover 36 preventing the supply of wax from catching on fire, or spilling if the stove is tipped over.

Figure 13:
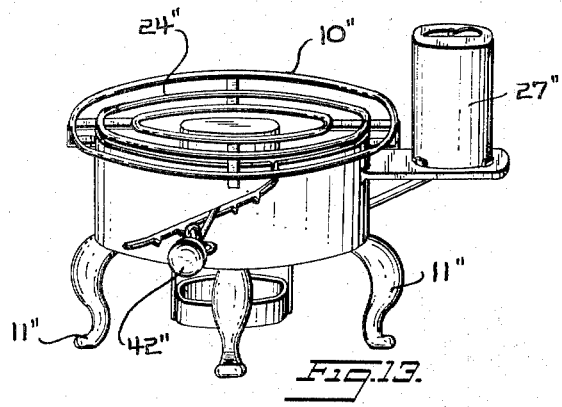
Fig. 13 is a perspective view of a heater and cooker constructed in accordance with a modification of this invention.

A small type of heater and cooker is shown in Fig. 13. Here the wax container 27″ is external, similar to Fig. 11 and may be of a type later to be described, namely the type shown in Fig. 14. In other respects the construction is similar to the heater and cooker of Fig. 1 but is very much shortened. Parts corresponding to like parts of the heater and cooker of Fig. 1 are indicated by like reference numerals with double prime marks added.

Figs. 14–16 show a wax container constructed in accordance with a modification of this invention. It may be used in place of the container of Fig. 1 and is also suitable for use, with slight changes, in the embodiments of Figs. 11 and 13.

It has a top 36a, an inner cylinder 28a and an outer cylinder 29a. Fins 35a radiate from the outer cylinder. The inner cylinder has a bottom wall 50 provided at its under surface with four tapered slots 51 each communicating with the interior of the container through an orifice 52. A stem 53 extends upwardly into the container and ends in a toothed head 54. An indicator handle 55 on top of the cover 36a is connected to the stem 53 by a toothed member 56 adapted to fit on the toothed head. Thus by rotating the handle 55, the inner cylinder may be rotated relative to the outer cylinder to control the flow of wax through the pipes 33a. It will be obvious that the handle may be turned enough to turn each of the slots 51 past the pipes 33a to cut off the fuel supply. Clearly the element referred to as a bottom wall 50 does not require an inner cylinder, as the inner cylinder 28a, in order to function as described. It will be obvious that this element may be disposed in the bottom of a stationary fuel cylinder and there operated by the stem 53 as described.

The cover is secured to the outer casing by a latch device, best shown in Figs. 18 and 19. This includes a lug 57 extending from the outer casing and having a groove 58 in its lower face. A lug 59 extends from the cover. A rectangle made of round wire 60 is pivoted to the lug 59 and adapted to swing under the lug 57, whereupon its bottom piece fits in the groove 58. The rectangle has a forwardly extending handle portion 61.

Figure 11:
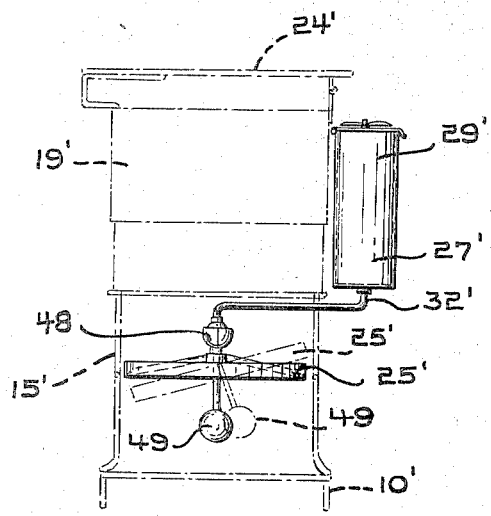
Fig. 11 is an elevational view of a heater and cooker constructed in accordance with a modification of this invention, partly shown in dot-dash lines.
Figure 12:
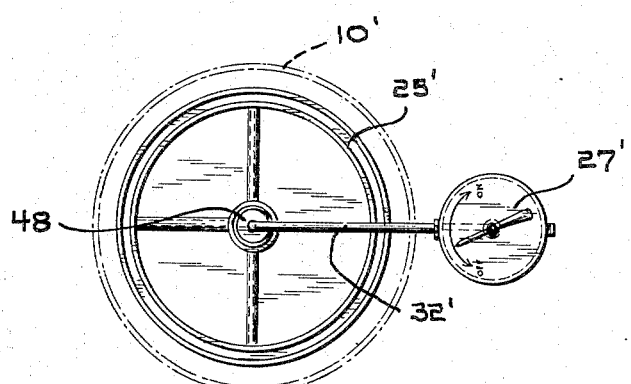
Fig. 12 is a plan view of the heater and cooker of Fig. 11, partly shown in dot-dash lines.

It is contemplated that this portable heater and cooker may find application to small boats, parked cars and airplanes where other types of stoves, such as alcohol or gasolene are condemned due to the fire hazard. In a car, the heater will keep both the car and motor warm when the motor is off. When used on a boat, car or airplane the heater and cooker may be modified, as shown in the embodiment of Figs. 11 and 12, so that the burner will be maintained horizontal. To this end, the wax chamber 27' is placed externally of the stove and piped by a pipe 32' to a burner 25' which is suspended from a universal joint 48.

A depending weight 49 is provided for maintaining the burner horizontal and for swinging it about the universal joint to this end when the stove otherwise tilts as when the boat rocks or the car is parked on an incline, or the airplane is in its usual position when grounded. If the stove is made of aluminum it is extremely light in weight. In other respects, the portable heater and cooker of Figs. 11 and 12 will be similar to the portable heater and cooker of Fig. 1, and no further description thereof is deemed necessary, similar parts being indicated by like reference numerals with a prime added.

The wax cylinder or refill used as fuel is, of course, replaceable with wax refills, which need simply be dropped in the wax chamber through the open center of the grid after the chamber cover has been removed, and this may be done while the stove is lit. The hard wax is reduced to liquid form by heat conduction and feeds the wick as required. The ring assembly 40 causes the flame of the wax to burn blue and very hot. The flame is raised and lowered by raising and lowering the ring assembly 40.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An apparatus of the character described comprising a base, a casing conformed to and mounted upon said base, a cylindrical fuel receptacle supported upon said base and disposed centrally relative to said casing; said fuel receptacle being open at its top and provided with a cover, and provided at its base with a fuel outlet, a burner on said base surrounding the base of said fuel receptacle, means connecting said fuel receptacle with said burner, a valve for controlling the supply of fuel to said burner, said burner including an annular trough-shaped member, a wick in said trough-shaped member and an annular baffle conformed to and adapted to enclose the open end of said annular trough-shaped member, said baffle having secondary air passages therein, means on said baffle for adjusting the same relative to said trough-shaped member, means for actuating said fuel supply valve, and means independent of said last means for actuating said baffle adjusting means.

2. An apparatus of the character described comprising a base, a casing conformed to and mounted upon said base, a cylindrical fuel receptacle supported upon said base and disposed centrally relative to said casing; said fuel receptacle being open at its top and provided with a cover, and provided at its base with a fuel outlet, a burner on said base surrounding the base of said fuel receptacle, means connecting said fuel receptacle with said burner, a valve for controlling the supply of fuel to said burner, said burner including an annular trough-shaped member, a wick in said trough-shaped member and an annular baffle conformed to and adapted to enclose the open end of said annular trough-shaped member, said baffle having secondary air passages therein, means on said baffle for adjusting the same relative to said trough-shaped member, a priming pan disposed below said burner for receiving fuel to initiate the operation of the apparatus when cold, means for actuating said fuel supply valve, and means independent of said last means for actuating said baffle adjusting means.

3. An apparatus of the character described comprising a base; a casing conformed to and mounted upon said base; a cylindrical fuel receptacle supported upon said base, said fuel receptacle being open at its top and provided with a cover, and provided at its base with a fuel outlet; a burner on said base; means connecting said fuel receptacle with said burner; a valve for controlling the supply of fuel to said burner; said burner including an annular trough-shaped member, a wick in said trough-shaped member and an annular baffle conformed to and adapted to enclose the open end of said annular trough-shaped member, said baffle having secondary air passages therein; means on said baffle for adjusting the same relative to said trough-shaped member; means for actuating said fuel supply valve, and means independent of said last means for actuating said baffle adjusting means.

4. An apparatus of the character described comprising a base; a casing conformed to and mounted upon said base; a cylindrical fuel receptacle supported upon said base, said fuel receptacle being open at its top and provided with a cover, and provided at its base with a fuel outlet; a burner on said base; means connecting said fuel receptacle with said burner; a valve for controlling the supply of fuel to said burner; said burner including an annular trough-shaped member, a wick in said trough-shaped member and an annular baffle conformed to and adapted to enclose the open end of said annular trough-shaped member, said baffle having secondary air passages therein; means on said baffle for adjusting the same relative to said trough-shaped member; a priming pan disposed below said burner for receiving fuel for initiating the operation of the apparatus when cold; means for actuating said fuel supply valve, and means independent of said last means for actuating said baffle adjusting means.

WILLIAM A. BAILEY.

REFERENCES CITED

The following references are of record in the file of this patent:

UNITED STATES PATENTS

| Number | Name | Date |
|---|---|---|
| 60,680 | Brown | Jan. 1, 1867 |
| 355,498 | Bekofsky | Jan. 4, 1887 |
| 426,802 | Hammer | Apr. 29, 1890 |
| 546,632 | Wojidkow | Sept. 17, 1895 |
| 1,176,172 | Schleusselburg | Mar. 21, 1916 |
| 1,254,019 | Ball | Jan. 22, 1918 |
| 1,343,341 | Berglann | June 15, 1920 |
| 1,393,706 | Shannon | Oct. 11, 1921 |
| 1,879,955 | Smith | Sept. 27, 1932 |
| 1,905,067 | Sherrick | Apr. 25, 1933 |
| 1,921,666 | Fransosi | Aug. 8, 1933 |
| 1,973,165 | Fioroni | Sept. 11, 1934 |
| 2,219,170 | Bailey | Oct. 22, 1940 |

FOREIGN PATENTS

| Number | Country | Date |
|---|---|---|
| 24,552 | Switzerland | July 8, 1901 |
| 51,236 | Switzerland | May 7, 1910 |
| 60,123 | Germany | Nov. 30, 1891 |
| 100,163 | Germany | Dec. 16, 1898 |
| 104,361 | Australia | June 23, 1938 |